United States Patent
Ikeda et al.

(10) Patent No.: US 10,518,813 B2
(45) Date of Patent: Dec. 31, 2019

(54) VEHICLE PILLAR STRUCTURE

(71) Applicant: TOYOTA JIDOSHA KABUSHIKI KAISHA, Toyota-shi, Aichi-ken (JP)

(72) Inventors: Koki Ikeda, Toyota (JP); Motoya Sakabe, Nissin (JP); Kazuki Komoriya, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 15/884,916

(22) Filed: Jan. 31, 2018

(65) Prior Publication Data
US 2018/0273104 A1  Sep. 27, 2018

(30) Foreign Application Priority Data

Mar. 27, 2017 (JP) .................................. 2017-061556

(51) Int. Cl.
*B62D 25/04* (2006.01)
*B62D 25/02* (2006.01)

(52) U.S. Cl.
CPC .............. *B62D 25/04* (2013.01); *B62D 25/02* (2013.01)

(58) Field of Classification Search
CPC ....... B62D 25/04; B62D 29/005; B62D 25/02
See application file for complete search history.

(56) References Cited

U.S. PATENT DOCUMENTS 6,428,087 B1 *  8/2002  Frasher .................. B60R 21/04
                                                      296/146.1
2011/0248525 A1  10/2011  Lundstroem

FOREIGN PATENT DOCUMENTS

JP   2006-0273057 A   10/2006
JP   2013-075661 A    4/2013

* cited by examiner

*Primary Examiner* — D Glenn Dayoan
*Assistant Examiner* — Melissa Ann Bonifazi
(74) *Attorney, Agent, or Firm* — Oliff PLC (57) ABSTRACT

A vehicle pillar structure that includes: a first framework section that extends along a first vehicle width direction side edge of a front windshield of a vehicle; a second framework section that is provided so as to form a gap toward a vehicle rear and vehicle width direction outer side of the first framework section, that extends along the first framework section; and a see-through section that is formed so as to be see-through and that spans between the first framework section and the second framework section, wherein the first framework section and the second framework section are each formed with a closed cross-section as viewed along their length directions, and at least one of a rear edge corner of the first framework section or a front edge corner of the second framework section is formed with a beveled profile.

3 Claims, 5 Drawing Sheets

VEHICLE PILLAR STRUCTURE

CROSS-REFERENCE TO RELATED APPLICATION

This application is based on and claims priority under 35 USC 119 from Japanese Patent Application No. 2017-061556 filed on Mar. 27, 2017, which is incorporated by reference herein.

BACKGROUND

Technical Field

The present disclosure relates to a vehicle pillar structure.

Related Art

In a pillar structure described in Japanese Patent Application Laid-Open (JP-A) No. 2006-273057, a pair of panels (a front pillar inner panel and a front pillar outer panel) configuring framework of a front pillar of a vehicle are each formed with an opening. A transparent member configured from a transparent resin is held between the pair of panels. This broadens the field of view of a driver (reduces the size of a blind spot). Moreover, the transparent member is thick, thereby securing the strength of the front pillar.

However, in the pillar structure configured as described above, since large openings are formed in the pair of panels configuring the front pillar framework, there is room for improvement from the perspective of improving the strength of the front pillar. For example, configuring framework sections of the front pillar with closed cross-sections may be considered in this regard. However, in cases in which framework sections are configured with closed cross-sections, there is a trade-off in that attempting to suppress an increase in the size of the blind spot of an occupant of a driving seat results in an increase in the size of the blind spot of an occupant of a passenger seat.

SUMMARY

In consideration of the above circumstances, an object of the present disclosure is to obtain a vehicle pillar structure capable of reducing the size of blind spots for front seat occupants on both vehicle width direction sides, while improving the strength of the pillar.

A vehicle pillar structure of an aspect includes a first framework section, a second framework section, and a see-through section. The first framework section extends along a first vehicle width direction side edge of a front windshield of a vehicle, and configures framework of a pillar. The second framework section is provided so as to form a gap toward a vehicle rear and vehicle width direction outer side of the first framework section, extends so as to follow the first framework section, and configures the framework. The see-through section is formed so as to be see-through, and spans between the first framework section and the second framework section. The first framework section and the second framework section are each formed with a closed cross-section as viewed along their length directions, and at least one out of a rear edge corner of the first framework section or a front edge corner of the second framework section is formed with a beveled profile.

DESCRIPTION OF EMBODIMENTS

Explanation follows regarding a vehicle pillar structure 10 according to an exemplary embodiment of the present disclosure, with reference to FIG. 1 to FIG. 4. Note that in the drawings, the arrow FR, the arrow UP, and the arrow RH (OUT) respectively indicate forward (a direction of travel), upward, and right (outward in a vehicle width direction) with respect to the vehicle, as appropriate. Hereafter, unless specifically stated otherwise, reference simply to the front and rear, left and right, and upward and downward directions refers to the front and rear in a vehicle front-rear direction, left and right in a vehicle left-right direction (vehicle width direction), and upward and downward in a vehicle vertical direction. Moreover, in the drawings, some reference numerals may be omitted in order to aid understanding of the drawings.

Configuration

Figure 1:
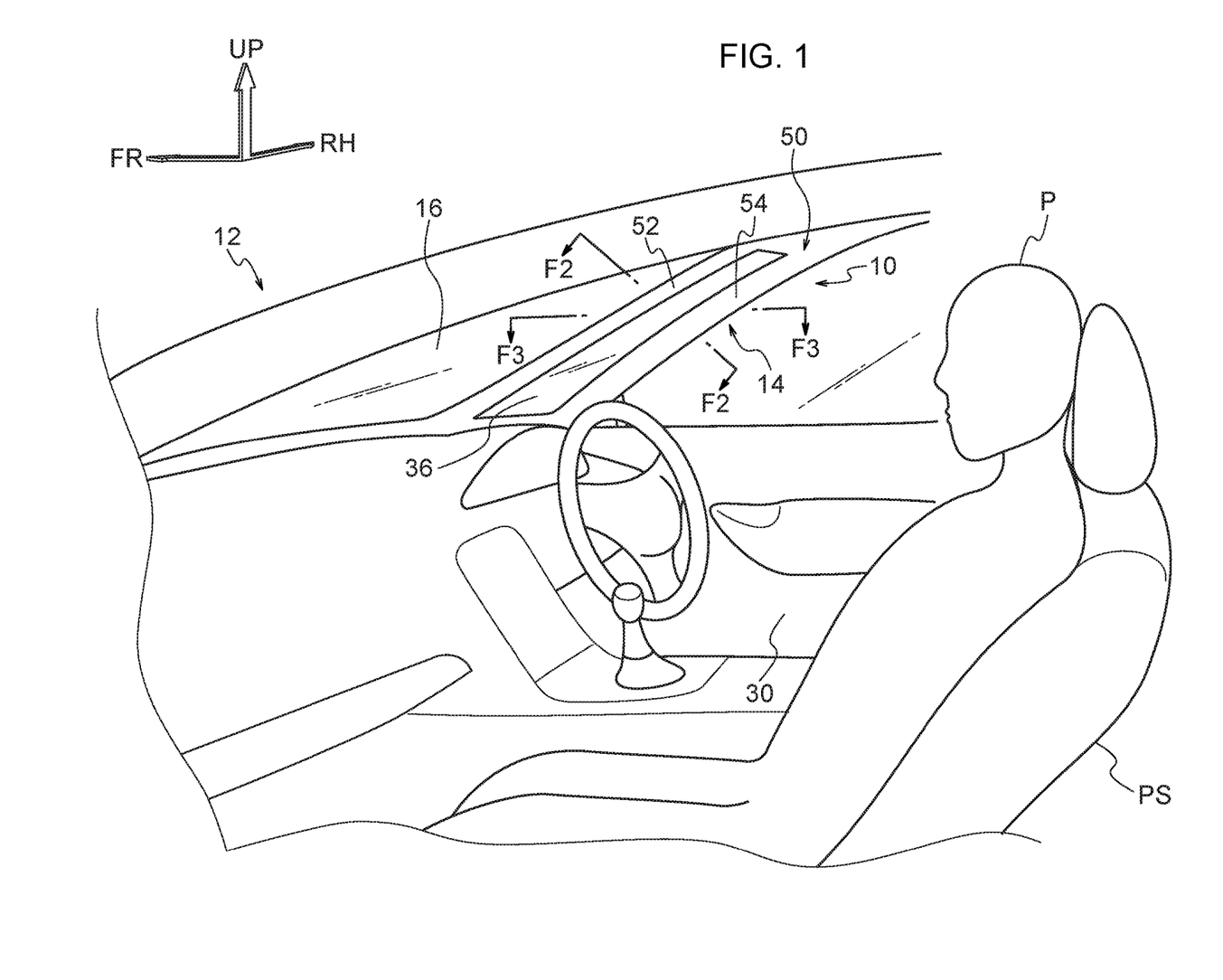
FIG. 1 is a perspective view of a front section of a vehicle cabin of a vehicle in which a driving-seat side front pillar is applied with a vehicle pillar structure according to an exemplary embodiment of the present disclosure, as viewed from the left of the vehicle.
Figure 2:
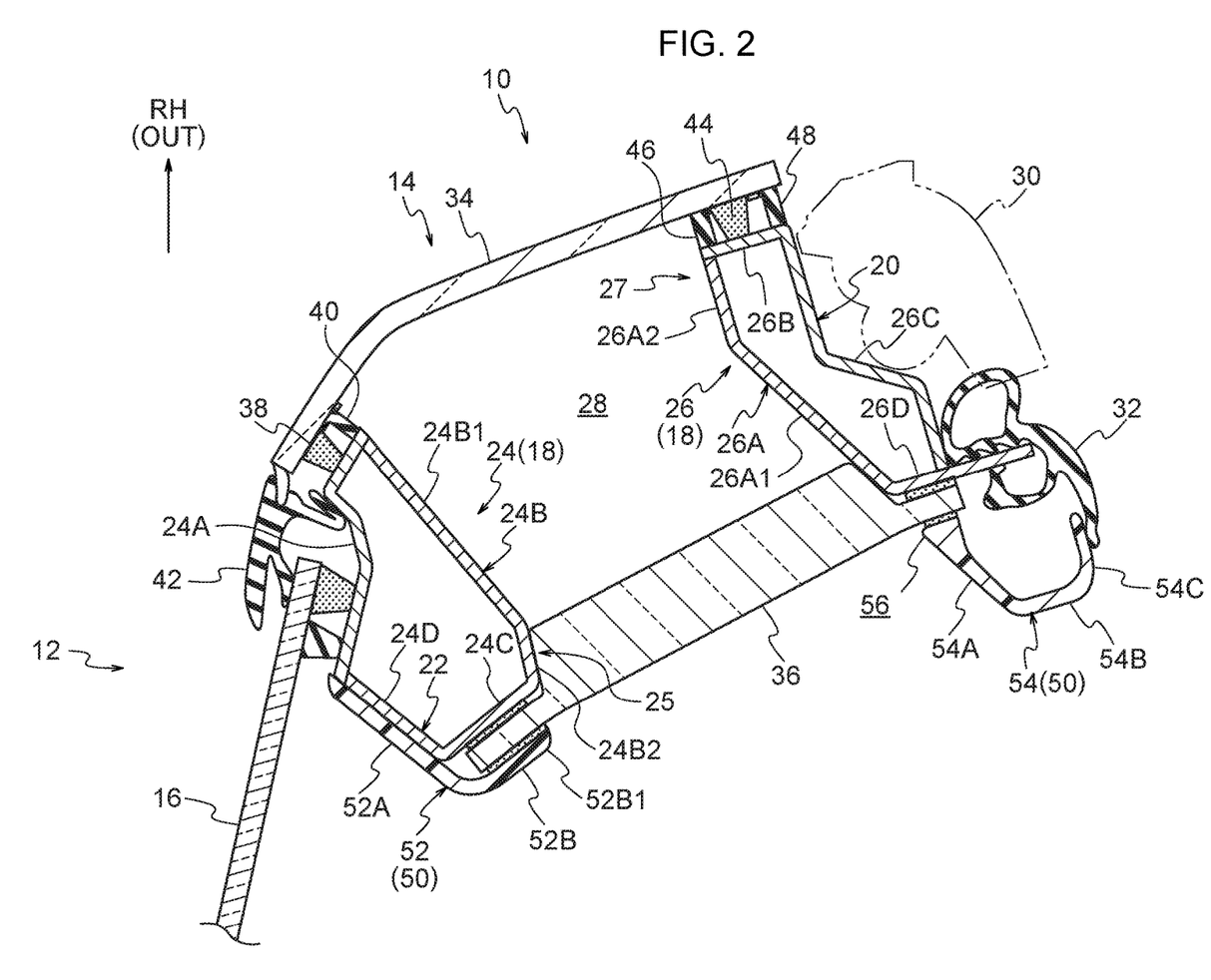
FIG. 2 is an enlarged cross-section taken along line F2-F2 in FIG. 1.
Figure 3:
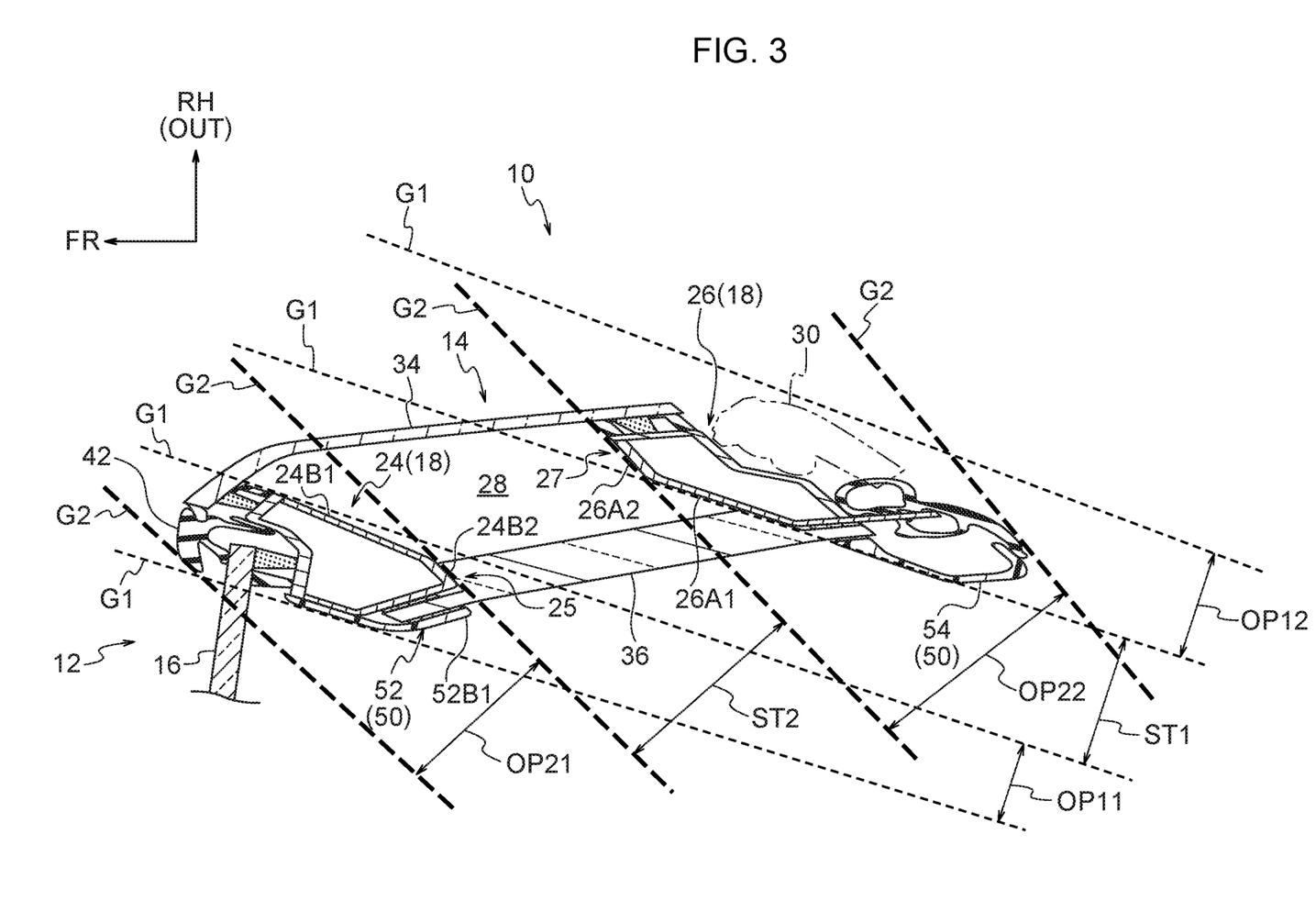
FIG. 3 is an enlarged cross-section taken along line F3-F3 in FIG. 1.

As illustrated in FIG. 1 to FIG. 3, a vehicle pillar structure 10 according to an exemplary embodiment of the present disclosure is applied to a front pillar 14 on a first vehicle width direction side (driving-seat side) of a right-hand drive vehicle 12. The front pillar 14 corresponds to a "pillar" of the present disclosure, and is disposed on the right (first vehicle width direction side) of a front windshield 16 of the vehicle 12. Relevant portions configuring the front pillar 14 include a pillar frame 18, a pillar outer glass 34, a pillar inner glass 36, and a pillar garnish 50. The pillar outer glass 34 and the pillar inner glass 36 correspond to a "see-through section" of the present disclosure. Note that in cases in which the vehicle pillar structure according to the present disclosure is applied to a front pillar of a left-hand drive vehicle, a configuration with left-right symmetry to the present exemplary embodiment is adopted.

The pillar frame 18 is, for example, formed by joining together a pillar outer panel 20 and a pillar inner panel 22, both configured from super-high tensile sheet steel. The pillar frame 18 spans between a front pillar lower and a front header. The pillar frame 18 includes a first framework section 24 extending along a right edge (first vehicle width direction side edge) of the front windshield 16. The pillar frame 18 also includes a second framework section 26 provided so as to form a gap 28 toward the vehicle rear and vehicle width direction outer side of the first framework section 24, and extending so as to follow the first framework section 24. The first framework section 24 and the second framework section 26 configure framework of the front pillar 14, and are inclined toward the vehicle rear on progression upward in the vehicle.

The first framework section (first column) 24 is formed in a hollow column shape, and is formed with a closed, substantially rectangular cross-section as viewed along its length direction (extension direction). More specifically, the first framework section 24 includes a front wall 24A forming a front face of the first framework section 24, an outer wall 24B extending from a vehicle width direction outer edge of the front wall 24A toward the vehicle rear and vehicle width direction inner side, a rear wall 24C extending from a rear edge (vehicle width direction inner edge) of the outer wall 24B toward the vehicle front and the vehicle width direction inner side, and an inner wall 24D extending from a vehicle width direction inner edge of the rear wall 24C toward the vehicle front and the vehicle width direction outer side. A front edge (vehicle width direction outer edge) of the inner wall 24D is connected to a vehicle width direction inner edge of the front wall 24A. The rear wall 24C and the inner wall 24D are set with shorter cross-section lengths than the front wall 24A and the outer wall 24B as viewed along the length direction of the first framework section 24.

The front wall 24A is configured by the pillar outer panel 20. The outer wall 24B, the rear wall 24C, and the inner wall 24D are configured by the pillar inner panel 22. The front wall 24A extends substantially along the vehicle width direction, and has a cross-section bent substantially into a crank shape as viewed along the length direction of the first framework section 24. A location at the vehicle width direction outer side of the front wall 24A projects out further toward the vehicle front than a location at the vehicle width direction inner side of the front wall 24A.

The outer wall 24B is configured by an outer wall body 24B1 inclined toward the vehicle front on progression toward the vehicle width direction outer side, and a first beveled portion 24B2 extending from a rear edge of the outer wall body 24B1 toward the vehicle width direction inner side and slightly toward the vehicle rear. The first beveled portion 24B2 is bent toward the vehicle width direction inner side with respect to the outer wall body 24B1, and is set with a smaller angle of inclination with respect to the vehicle width direction than that of the outer wall body 24B1. The first beveled portion 24B2 is formed at a rear edge corner 25, this being a corner provided at a rear edge of the first framework section 24, and is set with a shorter cross-section length than that of the outer wall body 24B1 as viewed along the length direction of the first framework section 24. Note that the rear edge corner 25 described above is a corner that faces the second framework section 26.

Similarly to the first framework section 24, the second framework section (second column) 26 is also formed in a hollow column shape, and is formed with a closed, substantially rectangular cross-section as viewed along its length direction (extension direction). More specifically, the second framework section 26 includes a front wall 26A forming a front face of the second framework section 26, an outer wall 26B extending from a vehicle width direction outer edge of the front wall 26A toward the vehicle rear and slightly toward the vehicle width direction outer side, a rear wall 26C extending from a rear edge of the outer wall 26B toward the vehicle width direction inner side and slightly toward the vehicle rear, and an inner wall 26D extending from a vehicle width direction inner edge of the rear wall 26C both toward the vehicle front and slightly toward the vehicle width direction inner side and toward the vehicle rear and slightly toward the vehicle width direction outer side. A front edge of the inner wall 26D is connected to a vehicle width direction inner edge of the front wall 26A. The outer wall 26B and the inner wall 26D are each set with a shorter cross-section length than that of the front wall 26A and the rear wall 26C as viewed along the length direction of the second framework section 26. The inner wall 26D projects out further toward the vehicle rear than the rear wall 26C. An opening weather strip 32 that is made from rubber and that forms a seal between a front side door 30 and the front pillar 14 is attached to this projecting portion.

The front wall 26A and the inner wall 26D are configured by the pillar inner panel 22, and the rear wall 26C and the outer wall 26B are configured by the pillar outer panel 20. The rear wall 26C extends substantially along the vehicle width direction, and has a cross-section bent substantially into a crank shape as viewed along the length direction of the second framework section 26. A vehicle width direction inner side location of the rear wall 26C projects out further toward the vehicle rear than a vehicle width direction outer side location of the rear wall 26C.

Moreover, the front wall 26A is configured by a front wall body 26A1 that is inclined toward the vehicle front on progression toward the vehicle width direction outer side, and a second beveled portion 26A2 extending from a front edge of the front wall body 26A1 toward the vehicle width direction outer side and slightly toward the vehicle front. The second beveled portion 26A2 is bent toward the vehicle width direction outer side with respect to the front wall body 26A1, and is set with a smaller angle of inclination with respect to the vehicle width direction than that of the front wall body 26A1. The second beveled portion 26A2 forms a front edge corner 27, this being a corner provided at a front edge of the second framework section 26. The second beveled portion 26A2 is set with a shorter cross-section length than the front wall body 26A1 as viewed along the length direction of the second framework section 26. Note that the front edge corner 27 described above is a corner that faces the first framework section 24.

The pillar outer glass 34 and the pillar inner glass 36 are, for example, configured from inorganic glass or a high strength transparent resin, and are formed in transparent sheet shapes. Note that examples of high strength transparent resins include glass-fiber reinforced polycarbonates (PC-GF), cellulose nanofiber reinforced polycarbonates (PC-CNF), and the like. The pillar outer glass 34 and the pillar inner glass 36 each span between the first framework section 24 and the second framework section 26.

Specifically, the pillar outer glass 34 is disposed at the vehicle outer side of the first framework section 24 and the second framework section 26, and forms a design face at the vehicle outer side of the front pillar 14. The pillar outer glass 34 is disposed such that its plate thickness direction runs in a direction orthogonal to the length direction of the front pillar 14, and is inclined toward the vehicle width direction inner side on progression toward the vehicle front. The pillar outer glass 34 is formed with a curving profile protruding toward the vehicle width direction outer side and the vehicle front as viewed along the length direction of the front pillar 14.

A front edge of the pillar outer glass 34 is disposed at the vehicle width direction outer side and the vehicle front of the front wall 24A of the first framework section 24, and is joined to the front wall 24A using an adhesive 38 such as a urethane sealant. Cushioning rubber 40 is provided at the vehicle rear of the adhesive 38, and a gap between the front wall 24A and the front edge of the pillar outer glass 34 is blocked off by the cushioning rubber 40. Moreover, a gap between the front edge of the pillar outer glass 34 and the front windshield 16 is blocked off by a windshield molding 42 that is made from rubber and is mounted around the outer periphery of the front windshield 16.

A rear edge of the pillar outer glass 34 is disposed at the vehicle width direction outer side of the outer wall 26B of the second framework section 26, and is joined to the outer wall 26B using an adhesive 44 such as a urethane sealant. Cushioning rubber 46, 48 is respectively provided at the vehicle front side and the vehicle rear side of the adhesive 44, and the cushioning rubber 46, 48 blocks off a gap between the outer wall 26B and the rear edge of the pillar outer glass 34.

The pillar inner glass 36 is disposed at the vehicle inner side of the first framework section 24 and the second framework section 26, and forms a design face at the vehicle inner side of the front pillar 14. The pillar inner glass 36 is disposed such that its plate thickness direction runs in a direction orthogonal to the length direction of the front pillar 14, and is inclined toward the vehicle width direction inner side on progression toward the vehicle front. Both front-rear direction edges of the pillar inner glass 36 are formed with the same thickness as the pillar outer glass 34. A front-rear direction intermediate portion of the pillar inner glass 36 is formed so as to be thicker than the pillar outer glass 34, and fits partially between the first framework section 24 and the second framework section 26.

A front edge of the pillar inner glass 36 is disposed at the vehicle width direction inner side and the vehicle rear of the rear wall 24C of the first framework section 24, and is joined to the rear wall 24C using double-sided adhesive tape (not allocated a reference numeral). A rear edge of the pillar inner glass 36 is disposed at the vehicle width direction inner side of the inner wall 26D of the second framework section 26, and is joined to the inner wall 26D using double-sided adhesive tape (not allocated a reference numeral).

The pillar garnish 50 is, for example, formed from a resin, and forms a design face at the vehicle inner side of the front pillar 14. The pillar garnish 50 includes a first pillar garnish section 52 covering the first framework section 24 from the vehicle width direction inner side, and a second pillar garnish section 54 covering the second framework section 26 from the vehicle width direction inner side and the vehicle rear. An opening 56 is formed between the first pillar garnish section 52 and the second pillar garnish section 54. The opening 56 extends along the length direction of the front pillar 14, and exposes the pillar inner glass 36 from the vehicle inner side.

The first pillar garnish section 52 is formed with a substantially L-shaped cross-section profile as viewed along the length direction of the front pillar 14. The first pillar garnish section 52 is disposed at the vehicle width direction inner side of the inner wall 24D of the first framework section 24, and is configured by a front portion 52A extending along the inner wall 24D, and a rear portion 52B extending from a rear edge of the front portion 52A, along the rear wall 24C of the first framework section 24, and toward the vehicle rear and the vehicle width direction outer side. The front edge of the pillar inner glass 36 is interposed between the rear portion 52B and the rear wall 24C, and the rear portion 52B is joined to the front edge of the pillar inner glass 36 using double-sided adhesive tape (not allocated a reference numeral).

The second pillar garnish section 54 is formed with a substantially C-shaped cross-section profile opening toward the vehicle width direction outer side as viewed along the length direction of the front pillar 14. The second pillar garnish section 54 is configured by a front portion 54A extending in the same plane as the front wall body 26A1 of the second framework section 26, an intermediate portion 54B extending from a vehicle width direction inner edge of the front portion 54A toward the vehicle rear, and a rear portion 54C extending from a rear edge of the intermediate portion 54B toward the vehicle width direction outer side. The rear edge of the pillar inner glass 36 is interposed between a vehicle width direction outer edge of the front portion 54A and the inner wall 26D of the second framework section 26, and the front portion 54A is joined to the rear edge of the pillar inner glass 36 using double-sided adhesive tape (not allocated a reference numeral). A gap between the inner wall 26D of the second framework section 26 and the rear portion 54C is blocked off by the opening weather strip 32 described above.

Note that in the front pillar 14 configured as described above, the second framework section 26 is provided so as to form the gap 28 at the vehicle rear and vehicle width direction outer side of the first framework section 24, as described above. The transparent pillar outer glass 34 and pillar inner glass 36 span between the first framework section 24 and the second framework section 26. Accordingly, as schematically illustrated in FIG. 4, a driving seat occupant P1 (occupant on the first vehicle width direction side) and a front passenger seat occupant P2 (occupant on a second vehicle width direction side) are able to see outside of the vehicle 12 through the gap 28 between the first framework section 24 and the second framework section 26.

Figure 4:
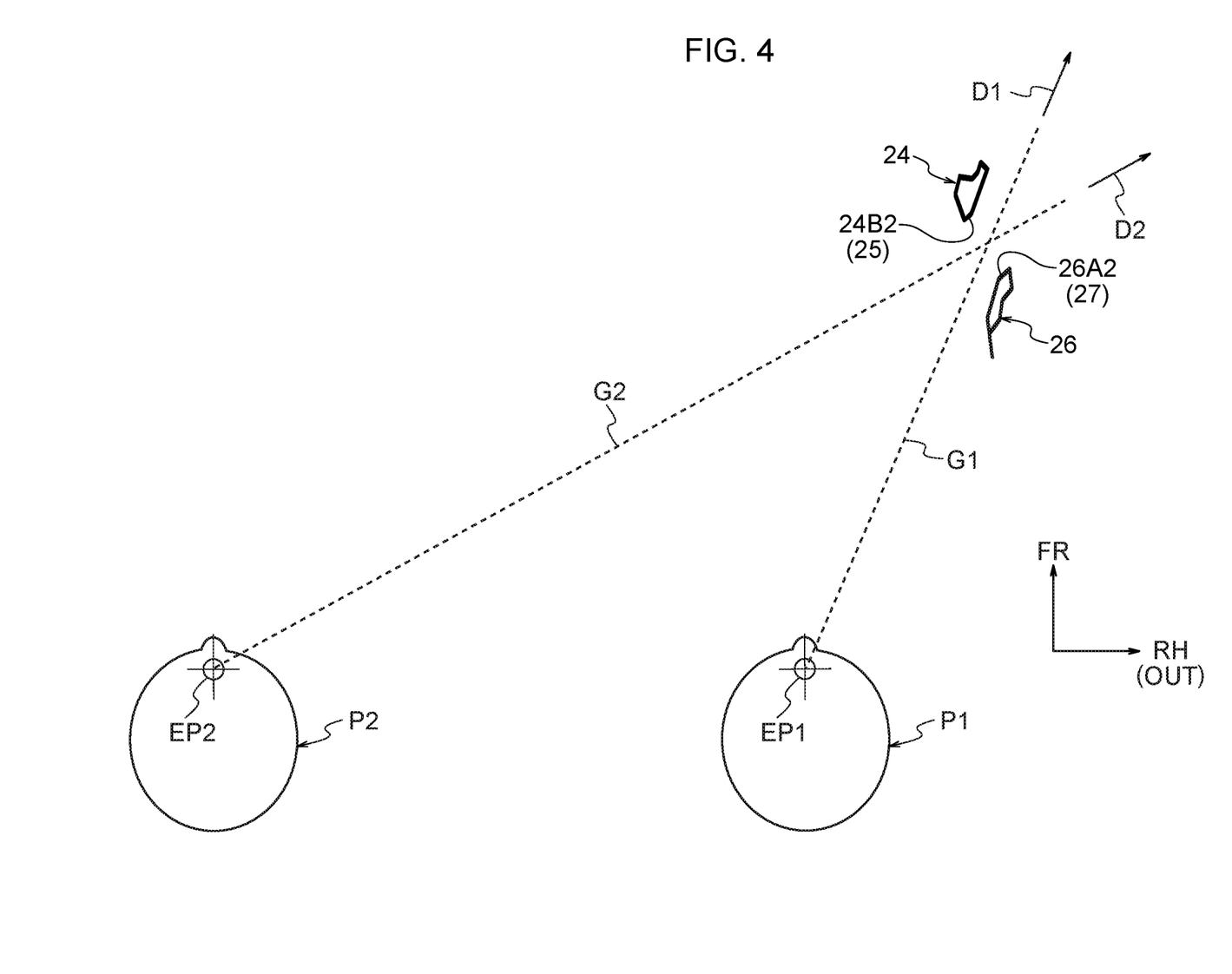
FIG. 4 is a schematic horizontal cross-section to explain gaze directions when the driving seat occupant and a front passenger seat occupant look at a driving-seat side front pillar.

Note that FIG. 4 is a horizontal cross-section schematically illustrating the first framework section 24 and the second framework section 26 at the height of eye points EP1, EP2 of the driving seat occupant P1 and the front passenger seat occupant P2. In FIG. 4, configuration members of the front pillar 14 other than the first framework section 24 and the second framework section 26 are omitted from illustration. The horizontal cross-section of the first framework section 24 and the second framework section 26 in FIG. 4 corresponds to the horizontal cross-section of the first framework section 24 and the second framework section 26 illustrated in FIG. 3.

In the present exemplary embodiment, the eye point EP1 of the driving seat occupant P1 is the central point on a straight line between the two eyes of driving seat occupant P1, and the eye point EP2 of the front passenger seat occupant P2 is the central point on a straight line between the two eyes of the front passenger seat occupant P2. In the present exemplary embodiment, the driving seat occupant P1 and the front passenger seat occupant P2 have a physical build equivalent to that of an AM50 ($50^{th}$ percentile American adult male), and are seated in the driving seat and front passenger seat PS (see FIG. 1) with a standard seated posture.

In FIG. 3 and FIG. 4, the dashed lines G1 indicate the gaze of the driving seat occupant P1 when the driving seat occupant P1 looks toward the front pillar 14. The dashed lines G2 indicate the gaze of the front passenger seat occupant P2 when the front passenger seat occupant P2 looks toward the front pillar 14. In FIG. 4, the arrow D1 indicates the direction of the gaze G1 when the driving seat occupant P1 looks toward the front pillar 14, and the arrow D2 indicates the direction of the gaze G2 when the front passenger seat occupant P2 looks toward the front pillar 14.

As illustrated in FIG. 3 and FIG. 4, in the present exemplary embodiment, as viewed in horizontal cross-section, the first framework section 24 and the second framework section 26 are both formed in elongated shapes that are long along the direction of sight D1 of the driving seat occupant P1. The outer wall body 24B1 of the first framework section 24 and the front wall body 26A1 of the second framework section 26 extend along the direction of sight D1 of the driving seat occupant P1.

Note that in FIG. 3, a region between the pair of adjacent dashed lines G1 separated by the arrow ST1 is a region in which the driving seat occupant P1 can see through the front pillar 14. A region between the pair of adjacent dashed lines G1 separated by the arrow OP11 and a region between the pair of adjacent dashed lines G1 separated by the arrow OP12 are regions in which the driving seat occupant P1 is unable to see through the front pillar 14. In the following explanation, the regions in which the driving seat occupant P1 is unable to see through the front pillar 14 are referred to as the "non see-through regions OP11, OP12".

Moreover, in FIG. 3, a region between the pair of adjacent dashed lines G2 separated by the arrow ST2 is a region in which the front passenger seat occupant P2 can see through the front pillar 14. A region between the pair of adjacent dashed lines G2 separated by the arrow OP21 and a region between the pair of adjacent dashed lines G2 separated by the arrow OP22 are regions in which the front passenger seat occupant P2 cannot see through the front pillar 14. In the following explanation, the region in which the front passenger seat occupant P2 can see through the front pillar 14 is referred to as the "see-through region ST2", and the regions in which the front passenger seat occupant P2 cannot see through the front pillar 14 are referred to as the "non see-through regions OP21, OP22".

Moreover, in the present exemplary embodiment, the rear edge corner 25 of the first framework section 24 is formed with a beveled profile as a result of forming the first beveled portion 24B2. Similarly, the front edge corner 27 of the second framework section 26 is formed with a beveled profile as a result of forming the second beveled portion 26A2. Namely, by forming the first beveled portion 24B2, the rear edge corner 25 is indented (withdrawn) toward the inside of the closed cross-section of the first framework section 24, and by forming the second beveled portion 26A2, the front edge corner 27 is indented (withdrawn) toward the inside of the closed cross-section of the second framework section 26.

Note that in the present exemplary embodiment, configuration is made in which the rear edge corner 25 and the front edge corner 27 are each formed with chamfer-type beveled profiles. However, there is no limitation thereto, and the rear edge corner 25 and the front edge corner 27 may be formed with rounded beveled profiles. Namely, the first beveled portion 24B2 and the second beveled portion 26A2 may be configured with curving profiles as viewed along the length direction of the front pillar 14.

Moreover, in the present exemplary embodiment, the first beveled portion 24B2 and the second beveled portion 26A2 extend along the direction of sight D2 of the front passenger seat occupant P2. Accordingly, the rear edge corner 25 and the front edge corner 27 are formed with beveled profiles running along the direction of sight D2 of the front passenger seat occupant P2. Moreover, in the present exemplary embodiment, a rear edge 52B1 of the first pillar garnish section 52 is disposed so as to overlap with the rear edge corner 25 of the first framework section 24 as viewed by the front passenger seat occupant P2. Specifically, the rear edge 52B1 of the first pillar garnish section 52 is formed so as to not project out further toward the vehicle rear than the rear edge corner 25 of the first framework section 24 as viewed by the front passenger seat occupant P2, and is disposed so as not to overlap with the gap 28.

Operation and Advantageous Effects

Next, explanation follows regarding operation and advantageous effects of the present exemplary embodiment.

In the vehicle pillar structure 10 configured as described above, the framework of the front pillar 14 is configured by the first framework section 24 extending along the right (driving-seat side) edge of the front windshield 16 of the vehicle 12, and the second framework section 26 extending so as to follow the first framework section 24. The first framework section 24 and the second framework section 26 are both formed with closed cross-sections as viewed along their length directions. The strength of the front pillar 14 can accordingly be improved in comparison to configurations in which the first framework sections 24, 26 are not configured with closed cross-sections.

Moreover, the second framework section 26 is provided so as to form the gap 28 at the vehicle rear and vehicle width direction outer side of the first framework section 24, and the transparent pillar outer glass 34 and pillar inner glass 36 span between the first framework section 24 and the second framework section 26. This thereby enables the driving seat occupant P1 to see outside the vehicle 12 through the aforementioned gap 28, and enables a reduction in size of a blind spot of the driving seat occupant P1 (a region at the exterior of the vehicle that cannot be seen by the driving seat occupant P1).

Figure 5:
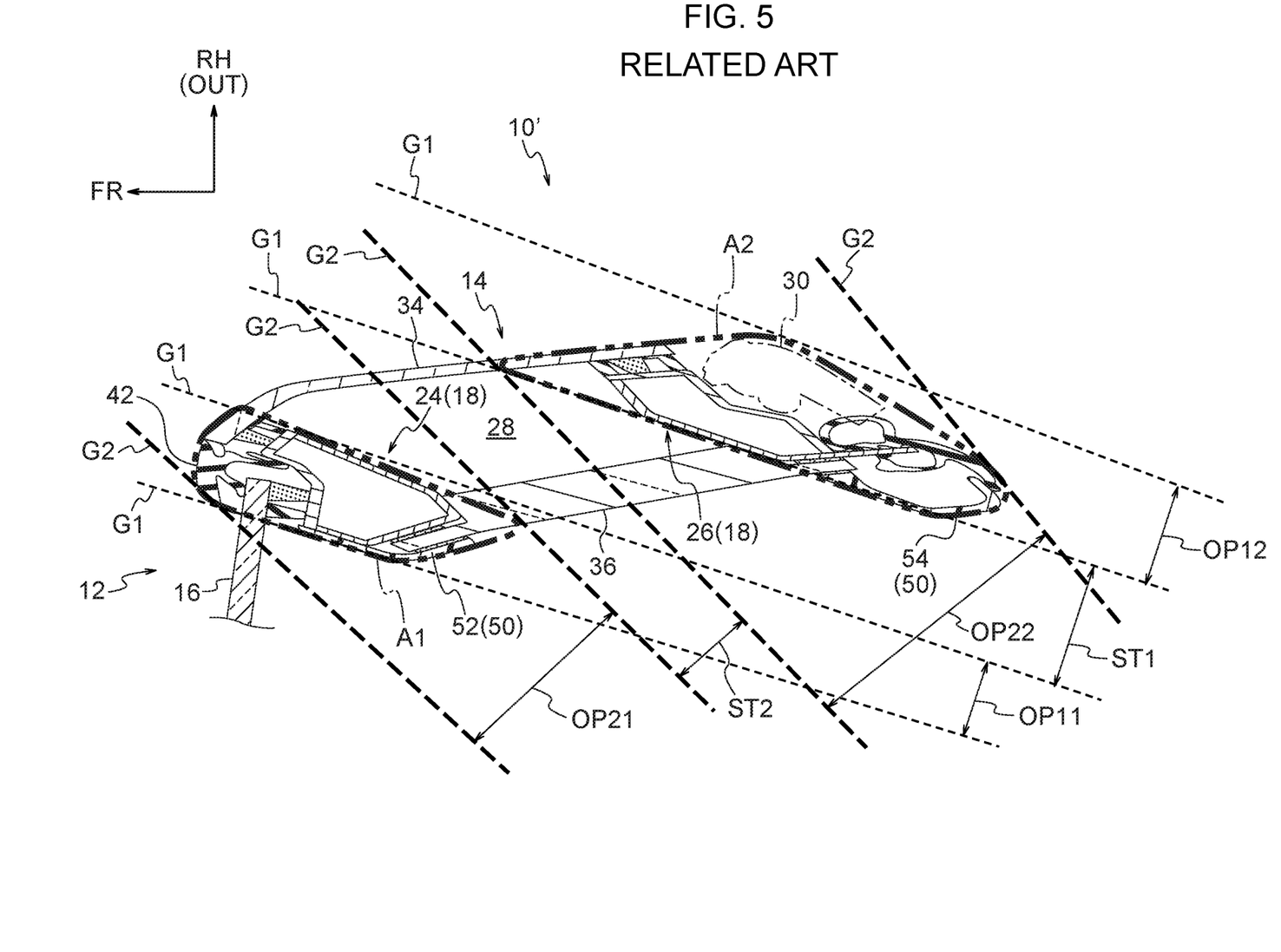
FIG. 5 a cross-section corresponding to FIG. 3 to explain the field of view of a front passenger seat occupant when a rear edge corner of a first framework section and a front edge corner of a second framework section are not formed with beveled profiles.

Moreover, the rear edge corner 25 of the first framework section 24 and the front edge corner 27 of the second framework section 26 are formed with beveled profiles. Accordingly, since the width of the gap 28 as viewed by the front passenger seat occupant P2 is enlarged, a blind spot of the front passenger seat occupant P2 (a region at the exterior of the vehicle that cannot be seen by the front passenger seat occupant P2) can be reduced in size. Namely, in cases in which the rear edge corner 25 of the first framework section 24 and the front edge corner 27 of the second framework section 26 are not formed with beveled profiles, for example as in the comparative example 10' illustrated in FIG. 5, in the front pillar 14, the regions indicated by the double-dotted dashed lines A1, A2 are non-see-through portions. In such cases, the width of the gap 28 as viewed by the front passenger seat occupant P2 is greatly reduced in comparison to the present exemplary embodiment, increasing the size of the blind spot of the front passenger seat occupant P2. However, this can be avoided in the present exemplary embodiment.

Moreover, in the present exemplary embodiment, as viewed in horizontal cross-section, the first framework section 24 and the second framework section 26 configuring the framework of the driving-seat side front pillar 14 are formed in elongated shapes that are long in the direction of sight of the driving seat occupant P1. The widths of the framework sections 24, 26 thus appear narrow as viewed by the driving seat occupant P1, enabling a further reduction in size of the blind spot of the driving seat occupant P1.

Moreover, in the present exemplary embodiment, the rear edge corner 25 of the first framework section 24 and the front edge corner 27 of the second framework section 26 are formed with beveled profiles along the direction of sight D2 of the front passenger seat occupant P2. This thereby enables the width of the gap 28 between the framework sections 24, 26 viewed by the front passenger seat occupant P2 to be efficiently enlarged, thereby enabling an efficient reduction in size of the blind spot of the front passenger seat occupant P2.

Moreover, in the present exemplary embodiment, the first framework section 24 is covered from the vehicle width direction inner side by the first pillar garnish section 52 of the pillar garnish 50. The rear edge 52B1 of the first pillar garnish section 52 overlaps the rear edge corner 25 of the first framework section 24 as viewed by the front passenger seat occupant P2. This thereby enables any obstruction of the field of view of the front passenger seat occupant P2 by the first pillar garnish section 52 to be prevented or suppressed.

Note that in the exemplary embodiment described above, configuration is made in which both the rear edge corner 25 and the front edge corner 27 are formed with beveled profiles. However, the present disclosure is not limited thereto, and configuration may be made in which only one out of the rear edge corner 25 and the front edge corner 27 is formed with a beveled profile.

Moreover, in the exemplary embodiment described above, explanation has been given regarding a case in which the first pillar garnish section 52 is configured by the front portion 52A and the rear portion 52B. However, the present disclosure is not limited thereto. For example, the first pillar garnish section 52 may be configured with a location extending out from the rear edge 52B1 of the rear portion 52B and along the outer wall body 24B1 of the first framework section 24 toward the vehicle width direction outer side and the vehicle front, such that the outer wall body 24B1 is covered by this location. In such cases, the pillar inner glass 36 would be omitted. Moreover, in such cases, a corner formed between this location and the rear portion 52B of the first pillar garnish section 52 is preferably formed with a beveled profile.

Moreover, in the exemplary embodiment described above, explanation has been given regarding a case in which the vehicle pillar structure according to the present disclosure is applied to the driving-seat side front pillar 14 on the driving-seat side of the vehicle 12. However, there is no limitation thereto, and the vehicle pillar structure according to the present disclosure may be applied to a front pillar on the front passenger seat side of the vehicle 12.

Various other modifications may be implemented within a range not departing from the spirit of the present disclosure. Moreover, the scope of rights encompassed by the present disclosure is not limited to the exemplary embodiment described above.

A vehicle pillar structure of a first aspect includes a first framework section, a second framework section, and a see-through section. The first framework section extends along a first vehicle width direction side edge of a front windshield of a vehicle, and configures framework of a pillar. The second framework section is provided so as to form a gap toward a vehicle rear and vehicle width direction outer side of the first framework section, extends so as to follow the first framework section, and configures the framework. The see-through section is formed so as to be see-through, and spans between the first framework section and the second framework section. The first framework section and the second framework section are each formed with a closed cross-section as viewed along their length directions, and at least one out of a rear edge corner of the first framework section or a front edge corner of the second framework section is formed with a beveled profile.

In the first aspect, the pillar framework is configured by the first framework section extending along the first vehicle width direction side edge of the front windshield of the vehicle, and the second framework section extending so as to follow the first framework section. The first framework section and the second framework section are each formed with a closed cross-section as viewed along their length direction. This enables the strength of the pillar to be improved in comparison to a configuration in which the respective framework sections are not configured with closed cross-sections.

Moreover, the second framework section is provided so as to form a gap toward the vehicle rear and vehicle width direction outer side of the first framework section. The see-through section formed so as to be see-through spans between the first framework section and the second framework section. This thereby enables a front seat occupant on the first vehicle width direction side, namely the side nearest the pillar, to see outside the vehicle through the aforementioned gap, thereby enabling the size of the blind spot of the front seat occupant to be reduced. Moreover, at least one out of the rear edge corner of the first framework section or the front edge corner of the second framework section is formed with a beveled profile. This thereby enlarges the width of the gap as viewed by a front seat occupant on the second vehicle width direction side (the side further from the pillar), thereby enabling the blind spot of the front seat occupant on the second vehicle width direction side to be reduced in size as well.

A vehicle pillar structure of a second aspect is the first aspect, wherein the first vehicle width direction side is a driving-seat side, and as viewed in horizontal cross-section, the first framework section and the second framework section are each formed in an elongated shape long along a direction of sight of a driving seat occupant.

In the second aspect, as viewed in horizontal cross-section, the first framework section and the second framework section configuring the framework of the pillar on the driving-seat side are each formed in an elongated shape long along the direction of sight of the driving seat occupant. The width of the respective framework sections therefore appears narrow as viewed by the driving seat occupant, enabling a further reduction in size of the blind spot of the driving seat occupant.

A vehicle pillar structure of a third aspect is the second aspect, wherein the at least one out of the rear edge corner of the first framework section or the front edge corner of the second framework section is formed with a beveled profile along a direction of sight of a front passenger seat occupant.

In the third aspect, the at least one out of the rear edge corner of the first framework section or the front edge corner of the second framework section is formed with a beveled profile along a direction of sight of the front passenger seat occupant. This thereby enables the width of the gap between the respective framework sections as viewed by the front passenger seat occupant to be efficiently enlarged, thereby enabling an efficient reduction in size of the blind spot of the front passenger seat occupant.

A vehicle pillar structure of a fourth aspect is any of the first aspect to the third aspect, further including a first pillar garnish section that covers the first framework section from the vehicle width direction inner side. In the fourth aspect, a rear edge of the first pillar garnish section overlaps the rear edge corner of the first framework section as viewed by a front seat occupant on a second vehicle width direction side.

In the fourth aspect, the first pillar garnish section covers the first framework section from the vehicle width direction inner side. The rear edge of the first pillar garnish section overlaps the rear edge corner of the first framework section as viewed by the front seat occupant on the second vehicle width direction side. This thereby enables any obstruction of the field of view of the front seat occupant on the second vehicle width direction side by the first pillar garnish section to be prevented or suppressed.

As described above, the vehicle pillar structure according to the present disclosure enables a reduction in size of the blind spots of front seat occupants on both vehicle width direction sides, while improving the strength of the pillar.

The invention claimed is:

1. A vehicle pillar structure comprising:
a first framework section that extends along a first vehicle width direction side edge of a front windshield of a vehicle and that configures a framework of a pillar;
a second framework section that is provided so as to form a gap toward a vehicle rear and vehicle width direction outer side of the first framework section, that extends along the first framework section, and that configures the framework; and
a see-through section that is formed so as to be see-through and that spans between the first framework section and the second framework section, wherein:
the first framework section and the second framework section are each formed with a closed cross-section as viewed along their length directions, and at least one of a rear edge corner of the first framework section or a front edge corner of the second framework section is formed with a beveled profile,
the first vehicle width direction side is a driving-seat side,
as viewed in horizontal cross-section, the first framework section and the second framework section are each formed in an elongated shape that is longest along a direction of sight of a driving seat occupant, and
the at least one of the rear edge corner of the first framework section or the front edge corner of the second framework section is formed with a beveled profile along a direction of sight of a front passenger seat occupant.

2. A vehicle pillar structure comprising:
a first framework section that extends along a first vehicle width direction side edge of a front windshield of a vehicle and that configures a framework of a pillar;
a second framework section that is provided so as to form a gap toward a vehicle rear and vehicle width direction outer side of the first framework section, that extends along the first framework section, and that configures the framework; and
a see-through section that is formed so as to be see-through and that spans between the first framework section and the second framework section, wherein:
the first framework section and the second framework section are each formed with a closed cross-section as viewed along their length directions, and at least one of a rear edge corner of the first framework section or a front edge corner of the second framework section is formed with a beveled profile,
the first vehicle width direction side is a front passenger seat side,
as viewed in horizontal cross-section, the first framework section and the second framework section are each formed in an elongated shape that is longest along a direction of sight of a front passenger seat occupant, and
the at least one of the rear edge corner of the first framework section or the front edge corner of the second framework section is formed with a beveled profile along a direction of sight of a driving seat occupant.

3. A vehicle pillar structure comprising:
a first framework section that extends along a first vehicle width direction side edge of a front windshield of a vehicle and that configures a framework of a pillar;
a second framework section that is provided so as to form a gap toward a vehicle rear and vehicle width direction outer side of the first framework section, that extends along the first framework section, and that configures the framework;
a see-through section that is formed so as to be see-through and that spans between the first framework section and the second framework section,
wherein the first framework section and the second framework section are each formed with a closed cross-section as viewed along their length directions, and at least one of a rear edge corner of the first framework section or a front edge corner of the second framework section is formed with a beveled profile; and
a first pillar garnish section that covers the first framework section from a vehicle width direction inner side,
wherein a rear edge of the first pillar garnish section overlaps with the rear edge corner of the first framework section, as viewed by a front seat occupant on a second vehicle width direction side.

* * * * *